United States Patent
Astier et al.

(10) Patent No.: US 10,471,670 B2
(45) Date of Patent: Nov. 12, 2019

(54) METHOD FOR RETREADING A TIRE CASING

(71) Applicants: Cedric Astier, Clermont-Ferrand (FR); Gregory Marcet, Clermont-Ferrand (FR)

(72) Inventors: Cedric Astier, Clermont-Ferrand (FR); Gregory Marcet, Clermont-Ferrand (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 0 days.

(21) Appl. No.: 15/107,278

(22) PCT Filed: Dec. 18, 2014

(86) PCT No.: PCT/FR2014/053412
§ 371 (c)(1),
(2) Date: Jun. 22, 2016

(87) PCT Pub. No.: WO2015/097372
PCT Pub. Date: Jul. 2, 2015

(65) Prior Publication Data
US 2018/0257325 A1     Sep. 13, 2018

(30) Foreign Application Priority Data
Dec. 23, 2013 (FR) ..................... 13 63447

(51) Int. Cl.
*B29D 30/54* (2006.01)

(52) U.S. Cl.
CPC ........ *B29D 30/54* (2013.01); *B29D 2030/544* (2013.01)

(58) Field of Classification Search
CPC ........ B29D 30/52; B29D 30/54; B29D 30/56; B29D 2030/544; B29D 2030/587
See application file for complete search history.

(56) References Cited

U.S. PATENT DOCUMENTS

| | | | | |
|---|---|---|---|---|
| 1,579,641 A | * | 4/1926 | Burdette | ................ B29D 30/54 156/382 |
| 2,282,580 A | * | 5/1942 | Hawkinson | ............ B29D 30/54 156/96 |
| 3,608,605 A | * | 9/1971 | Cole | ..................... B29D 30/42 152/533 |
| 3,809,592 A | | 5/1974 | Dennis et al. | |
| 3,894,897 A | | 7/1975 | Batchelor et al. | |
| 3,922,415 A | | 11/1975 | Dexter | |

(Continued)

FOREIGN PATENT DOCUMENTS

| | | |
|---|---|---|
| EP | 1 150 831 B1 | 3/2004 |
| GB | 2 210 001 A | 6/1989 |
| JP | 2011-42229 A | 3/2011 |

*Primary Examiner* — Geoffrey L Knable
(74) *Attorney, Agent, or Firm* — Dickinson Wright PLLC

(57) ABSTRACT

A method for retreading a tire casing is disclosed herein. The method includes a tread is disposed on a casing carcass with a bonding layer being interposed in between, and a strip is tensioned through several circuits on the tread. Also disclosed herein is a tire employing the a method of retreading disclosed herein.

16 Claims, 3 Drawing Sheets

(56) References Cited

U.S. PATENT DOCUMENTS

| | | | |
|---|---|---|---|
| 3,925,129 A | | 12/1975 | Blankenship |
| 3,933,551 A | | 1/1976 | Brodie et al. |
| 4,098,936 A | | 7/1978 | Rawls |
| 4,105,482 A | * | 8/1978 | Wapelhorst ......... B29C 35/0233 156/128.6 |
| 4,123,306 A | | 10/1978 | Landry |
| 4,202,394 A | * | 5/1980 | van der Burg ......... B29D 30/54 152/531 |
| 4,588,460 A | | 5/1986 | Magee et al. |
| 5,053,094 A | | 10/1991 | Detwiler |
| 6,630,044 B1 | | 10/2003 | Boling et al. |

* cited by examiner

METHOD FOR RETREADING A TIRE CASING

CROSS-REFERENCE TO RELATED APPLICATIONS

This application is a 371 national phase entry of PCT/FR2014/053412, filed 18 Dec. 2014, which claims the benefit of French Patent Application No. 1363447, filed 23 Dec. 2013, the contents of which are incorporated herein by reference for all purposes.

BACKGROUND

The invention relates to the retreading of tires.

The retreading operation conventionally consists in removing the worn tread from a tire casing in order to replace it with a new tread. To this end, it is known practice to provide the tire with a hot-melt bonding layer that bonds the tread to the carcass. With a view to retreading, this layer is applied to a tire carcass. Next, a tread that is compatible with use on a wheel is laid. Next, this layer is heated to a predetermined temperature that is characteristic of the material and then it is allowed to cool. On cooling, the layer ensures the adhesion of the tread to the carcass. The heating operation can be carried out before assembly, for example by infrared or forced convection, or after assembly, for example by contact conduction, electrical conduction, forced convection, high-frequency or microwave induction.

During heating, pressure should be applied to the tread in order to press it against the carcass. This pressing means should be compatible with the heating means used, that is to say should not impair the conduction or convection of the heat flow or any electrical connector which emerges from the heating means integrated into the tire, or should be transparent to electromagnetic radiation, to high-frequency or microwave induction.

SUMMARY

The aim of the invention is to improve the application of the pressure to the tread.

To this end, a method for retreading a tire casing is provided according to the invention, wherein:
   a tread is disposed on a casing carcass with a bonding layer being interposed in between, and
   a strip is tensioned through several circuits on the tread.

Thus, the tension of the strip creates pressure which presses the tread against the carcass and the bonding layer. In addition, the strip applies uniform pressure over the entire external surface of the tread. The method is multidimensional since the strip adapts to any type of tread.

In one embodiment, before the strip is tensioned, the carcass is inflated.

Thus, the joint action of the pressure brought about by the inflation and the pressure brought about by the tension of the strip allows the carcass and the tread to be pressed together. It is appropriate to inflate the carcass to a sufficiently high pressure. With low pressure inflation, for example between 0.5 and 1 bar, i.e. between 50 000 and 100 000 Pa, the crown of the casing tends to buckle locally and randomly, thereby causing irregularities in tension. By inflating the carcass to a pressure greater than 2 bar, i.e. 200 000 Pa, no buckling occurs.

Advantageously, the strip is applied to the tread in a first circuit without the strip being tensioned.

This first circuit, which thus forms a "dead" circuit, constitutes a simple means of anchoring the strip on the tread and thus makes it possible to fix the position of the tread and to avoid any risk of slipping once the strip is tensioned.

Preferably, the circuits or at least two of the circuits are contiguous.

Thus, the pressure applied by the tensioned strip to the tread is particularly uniform.

According to one embodiment, the strip is wrapped in several contiguous circuits and in a single layer.

By virtue of the contiguous nature of the circuits, a non-zero pressure is generated at all points on the bonding layer while the strip is tensioned. This also makes it possible to make the pressure applied by the strip to the tread uniform.

According to another embodiment, the strip is wrapped in at least two superposed layers, preferably in at least three layers.

In this way, the uniformity of the pressure applied by the strip to the tread is increased.

Advantageously, each layer comprises several circuits and the circuits are offset from one layer to another.

This configuration makes it possible to make the pressure applied by the strip to the tread even more uniform.

Preferably, the bonding layer is heated.

The heating thus makes it possible to melt this layer. The layer creates adhesion of the tread to the carcass once it has cooled to ambient temperature.

Preferably, the strip is then removed.

The tire casing is then ready to be mounted on a wheel.

Advantageously, the strip is inextensible along its length.

Preferably, the strip comprises a heat-shrinkable material.

In this way, the pressure applied by the strip to the tread is maximized for a given tension of the strip, notably during the heating of the bonding layer.

The strip may notably be heat-shrink cables. The heat-shrinkability of these cables compensates for the effects of relaxation of the modulus of the material of which the strip is made, and also of the entire crown of the tire, on account of the heating of the assembly. It is preferable to take this compensation effect into account in order to correctly calibrate the laying tension of the strip. This can be done after pressure measurements, for example at the bonding layer during the heating phase.

Advantageously, the strip comprises cables.

Advantageously, the matrix which connects all of these cables is cured or vulcanized rubber.

This matrix is relatively soft and allows adaptation of the strip to the profile of each tread pattern, either by spacing apart the cables, or by local shearing of the matrix to allow local developments of the cables that are slightly different in order that they are able to be pressed better against the tread patterns A tire casing which has undergone a retreading operation according to the invention is also provided.

BRIEF DESCRIPTION OF THE DRAWINGS

An embodiment of the invention will now be presented with reference to the appended drawings, in which.

DETAILED DESCRIPTION

An embodiment of the invention, which consists in retreading a wheel tire casing, will be described.

Prior to this embodiment, a tire casing comprising a carcass and a tread is provided. When the latter has become worn, it is necessary to remove it before fitting a new tread. When the casing is provided with a bonding layer comprising a hot-melt material, the layer is heated until it melts, thereby losing its adhesive property. It is thus possible to grasp the tread and separate it entirely from the rest of the casing by peeling.

The naked carcass then undergoes the retreading method.

Figure 1:
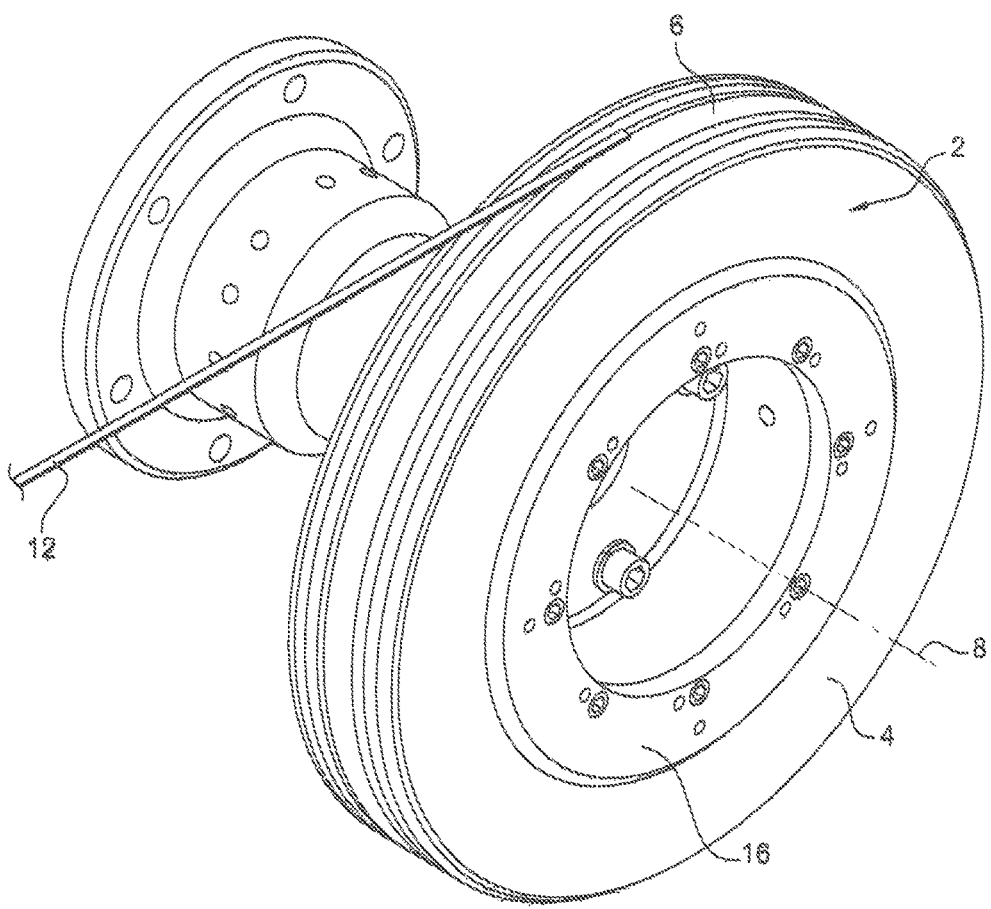
FIG. 1 is a perspective view of a tire casing that undergoes a method according to one embodiment of the invention.
Figure 2:
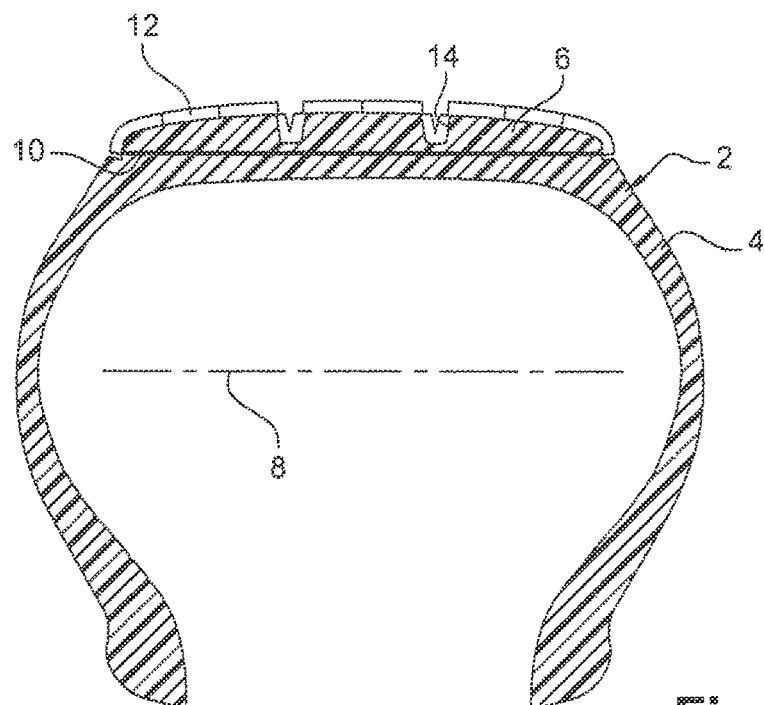
FIGS. 2 and 3 are views in radial section of the casing from FIG. 1 at different stages of the method.
Figure 3:
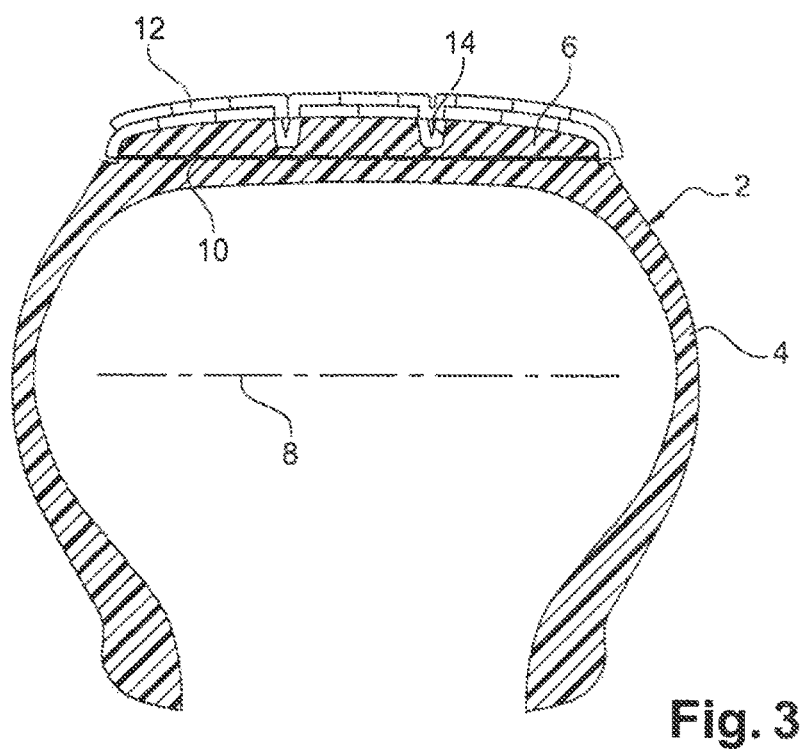

For this, with reference to FIGS. 1 to 3, a tread 6 in the form of a ring is fitted on a carcass 4, on the side of the latter that is furthest away from a main axis 8 of the carcass. The casing 2 thus formed also comprises a bonding layer 10 interposed between the carcass and the tread in the radial direction with respect to the axis 8. In this case, it is a layer made of a hot-melt material known per se. A hot-melt material is understood to be a material that is able to soften when it is heated in order to be brought to a predetermined temperature that is characteristic of the material, known as the softening temperature. For example, such a material can be chosen from thermoplastic elastomers such as SBS (stirene-butadiene-stirene) or SIS (stirene-isoprene-stirene). For the purposes of the invention, reference is made to a hot-melt material that is capable of softening at a temperature of between 140° C. and 200° C.

In addition, the carcass is mounted on a rim 16 and it is inflated to a pressure greater than 2 bar, i.e. 200 000 Pa. This pressure remains constant for as long as this inflation lasts.

The winding of the strip 12 onto the tread is started by carrying out a first dead circuit at one of the furrows of the tread patterns of the tread without tensioning the strip.

By way of example, use can be made of a strip of the "reinforcer at zero degrees" type, that is to say a strip formed by a set of cables that are substantially parallel to one another, made of aramid with a width L equal to 10 millimetres.

Tension can then be applied to the strip in order to fix the position of the tread with respect to the carcass. The pressure to which the carcass has been inflated allows the casing to withstand the tension applied by the strip and to avoid any slipping of the carcass on the rim. With L being the width of the strip, R the external radius of the tread, F the force applied to the strip in order to keep it under regulated tension and P the pressure exerted by the strip on the tread, theory gives the ratio between F and P as:

$$F = P \times R \times L$$

With reference to FIG. 3, where the number of layers is n, the tension F to be applied to the strip will be determined with the aid of the following formula:

$$F = P \times R \times L/n,$$

There can be two cases.

In the first case, the cables of the strip are not heat-shrink cables (that is to say they are heat-sensitive). The above formula is applied, taking into account a surplus of tension in order to compensate for the relaxation of the modulus of the tread so as to always ensure a minimum pressure at the bond line of the bonding layer. This surplus is determined from tests involving the measurement of the pressure at the bonding layer during assembly by heating, or by calculation, taking into account the change in the modulus of the tread as a function of the temperature. In the second case, the cables are heat-shrink cables. The force of contraction of the cables of the strip will be determined such that it compensates for the relaxation of the rubber products of the entire crown of the tire, and of the modulus of the strip itself so as always to ensure a minimum pressure at the bond line of the bonding layer. This force of contraction will be determined from tests involving the measurement of the pressure at the bonding layer during assembly by heating, or by calculation, taking into account the change in the modulus of the tread as a function of the temperature and the force of contraction which changes as a function of the temperature.

If the strip contains heat-shrink cables and non-heat-shrink cables (for example: 66% aramid and 33% nylon), the problem is more complex, and only tests involving the measurement of the pressure at the bond line will make it possible to determine the tension F.

With reference to FIGS. 2 and 3, the strip is wrapped through several circuits, which are preferably contiguous such that it covers the entirety of the external surface of the tread. The strip thus constitutes a first tensioned layer on the tread.

Following this first layer, the strip is wound over a second layer on top of the first by offsetting the circuits of the second layer with respect to the circuits of the preceding layer. Preferably, this operation is repeated once more such that three superposed layers cover the tread.

Figure 4:
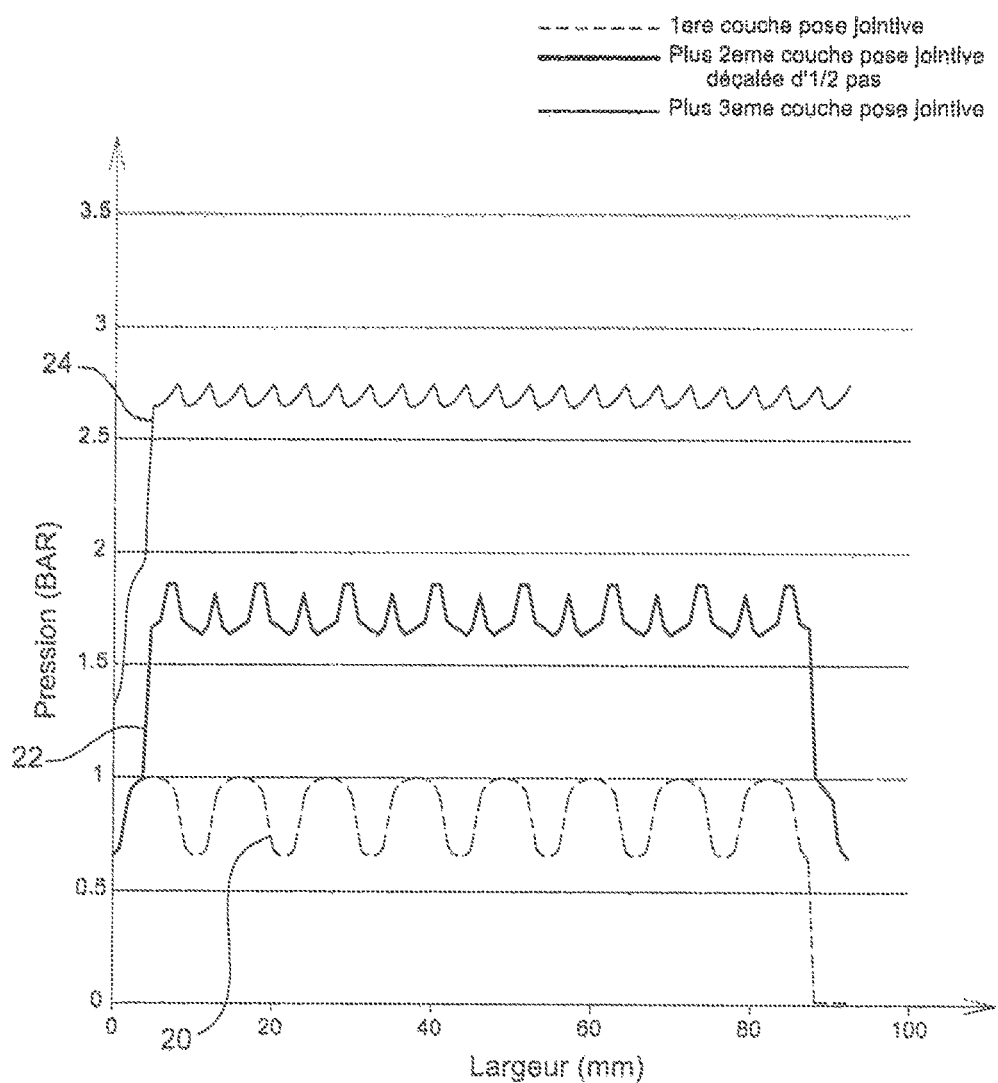
FIG. 4 is a graph illustrating the uniformity of the pressure applied by the tensioned strip in accordance with the number of layers it forms.

FIG. 4 illustrates on the y-axis the distribution of the pressure brought about by the tension of the strip on the tread layer after layer. The first curve 20 gives this distribution following the wrapping of the first layer. It will be noted that it is uniform across the width of the tread and varies between 0.6 and 1 bar, i.e. 60 000 and 100 000 Pa. More specifically, the pressure applied at the furrows is less than that applied away from the furrows. This lack of uniformity is also present on the second curve 22, that is to say following the wrapping of a second layer, but has a smaller amplitude since the pressure varies between 1.7 and 1.9 bar, i.e. 170 000 and 190 000 Pa. Following the wrapping of a third layer, it will be seen from the third curve 24 that the distribution of the pressure is virtually uniform, the value of the pressure being around 2.65 bar, i.e. 265 000 Pa, across the entire width of the tread. These curves were realized by applying a force F of around 250 N in order to tension the strip, for a tire of dimensions 115 85 R12.

The curves 20 to 24 clearly illustrate the fact that the contiguous circuits of the strip and the tread patterns of the tread are the cause of the lack of uniformity of pressure during the laying of the first layer. In particular, the pressure applied would be perfectly uniform if the tread were flat, but its shape means that the pressure is greater at the centre than at the ends. The distribution of the pressure is rendered more uniform after the laying of the second layer, and becomes virtually uniform following the laying of the third layer.

The tread and the carcass are then pressed firmly together.

The bonding layer is then heated in order to melt it or soften it. To this end, it is possible to heat the casing in its entirety, for example in an oven at 150° C. for one hour. If the strip comprises a heat-shrinkable material, it applies increased pressure to the tread during heating. It is also possible to locally heat the bonding layer. Heating can be carried out by microwaves or with the aid of an electrically powered heating ply (Joule effect) fitted beforehand in contact with the layer.

Once the bonding layer has melted, it is allowed to cool to a temperature below its melting point. The layer then solidifies and creates the adhesion of the tread to the carcass.

The strip is then removed. The casing can then be mounted on a wheel.

Of course, numerous modifications may be made to the invention without departing from the scope thereof.

The strip may consist of a material other than aramid and have other dimensions.

The bonding layer can be a bonding rubber, in which case it is not necessary to cool it after it has been heated with a view to retreading.

The invention claimed is:

1. A method for retreading a tire casing, comprising:
   disposing a tread on a casing carcass with a bonding layer being interposed in between,
   winding a strip around the tread multiple times circumferentially while tensioning it on the tread, and
   inflating the carcass before winding the strip around the tread while tensioning it.

2. The method according to claim 1, wherein the strip is initially placed on the tread in a first circuit without the strip being tensioned.

3. The method according to claim 1, wherein the circuits or at least two of the circuits are contiguous.

4. The method according to claim 3, wherein winding the circuits includes winding a plurality of first layer circuits into a first layer, wherein the first layer circuits are disposed in an edge to edge relationship with adjacent first layer circuits.

5. The method according to claim 4, wherein winding the circuits includes winding a plurality of second circuits into a second layer, wherein the second layer circuits are disposed in an edge to edge relationship with adjacent second layer circuits.

6. The method according to claim 5, wherein the edges of the plurality of first layer circuits are axially offset from the edges of the plurality of second layer circuits.

7. The method according to claim 1, wherein the strip is wrapped in at least two superposed layers.

8. The method according to claim 7, wherein each layer comprises several circuits and the circuits are offset from one layer to another.

9. The method according to claim 1, wherein the bonding layer is heated.

10. The method according to claim 1, wherein the strip is removed.

11. The method according claim 1, wherein the strip is inextensible along its length.

12. The method according to claim 1, wherein the strip comprises a heat-shrinkable material.

13. The method according to claim 1, wherein the strip comprises cables.

14. The method according to claim 1, wherein the strip is wrapped in at least three superposed layers.

15. The method according to claim 1, wherein the bonding layer comprises hot-melt material.

16. The method according to claim 1, wherein the carcass is inflated to at least 2 Bar.

* * * * *